(12) United States Patent
Reeves (10) Patent No.: US 7,232,130 B2
(45) Date of Patent: Jun. 19, 2007

(54) REAR DRIVE ASSEMBLY FOR A SNOW BICYCLE

(76) Inventor: Kyle Reeves, #5A-1009 Allsbrook Road, Parksville, British Columbia (CA) V9P 2A9

( * ) Notice: Subject to any disclaimer, the term of this patent is extended or adjusted under 35 U.S.C. 154(b) by 0 days.

(21) Appl. No.: 11/425,656

(22) Filed: Jun. 21, 2006

(65) Prior Publication Data
US 2006/0232026 A1 Oct. 19, 2006

(30) Foreign Application Priority Data
Feb. 14, 2005 (CA) .................................. 2497365

(51) Int. Cl.
*A63C 5/00* (2006.01)
(52) U.S. Cl. ..................... 280/7.1; 280/7.12; 280/7.15; 280/12.1; 180/184; 305/125
(58) Field of Classification Search ............... 280/12.1, 280/12.11, 12.12, 12.13, 12.14, 7.1, 7.12, 280/7.13, 7.14, 7.15, 844; 305/167, 168, 305/125; 180/184
See application file for complete search history.

(56) References Cited

U.S. PATENT DOCUMENTS

| | | | |
|---|---|---|---|
| 526,556 A * | 9/1894 | Bolton ....................... 280/12.1 |
| 1,261,204 A | 4/1918 | Barton |
| 1,281,980 A | 10/1918 | Kostewich |
| 2,467,947 A * | 4/1949 | Skelton ...................... 180/9.5 |
| 5,423,559 A * | 6/1995 | Rhode ...................... 280/12.14 |
| 5,474,146 A * | 12/1995 | Yoshioka et al. ........... 180/184 |
| 5,738,361 A | 4/1998 | Landucci |
| 6,007,074 A * | 12/1999 | Tarng ..................... 280/11.115 |
| 6,164,670 A * | 12/2000 | Abarca et al. ........... 280/12.14 |
| 6,234,263 B1 * | 5/2001 | Boivin et al. ............... 180/184 |
| 6,511,079 B1 | 1/2003 | Charles, Sr. |
| 6,615,939 B1 * | 9/2003 | Karales et al. ............. 180/9.26 |
| 6,626,258 B1 | 9/2003 | Forbes |

(Continued)

FOREIGN PATENT DOCUMENTS

CA 2 154 729 1/1997

OTHER PUBLICATIONS

Cheney Family Enterprise, Cheney Mountain SonMoBike, Available at http://www.snomobike.com/pages/home.html, At least as early as 2004.

*Primary Examiner*—Christopher P. Ellis
*Assistant Examiner*—John Walters
(74) *Attorney, Agent, or Firm*—Christensen O'Connor Johnson Kindness PLLC (57) ABSTRACT

A rear drive assembly for a snow bicycle includes a body adapted to be supported by an axle which rotatably supports a rear wheel of a bicycle. An upper arm is rigidly affixed to and extends upwardly from the body. A lower arm is rigidly affixed to and extends at an angle downwardly and rearwardly from the body. A track tensioning and guide assembly is positioned at the remote attachment end of the lower arm. An extendible and retractable attachment member is positioned at a remote attachment end of the upper arm and is, preferably, attached to a seat post of the bicycle. As the bicycle begins to ascend a slope the attachment member retracts to maintain the track in ground contact and as the bicycle begins to descend the slope the attachment member extends to maintain the track in ground contact.

3 Claims, 6 Drawing Sheets

U.S. PATENT DOCUMENTS 6,663,117 B2    12/2003  Cheney et al.
6,863,142 B2 *  3/2005   Corbeil .................. 180/185
6,874,586 B2 *  4/2005   Boivin et al. .............. 180/9.26
2004/0125154 A1  7/2004  Cheney et al.

* cited by examiner

REAR DRIVE ASSEMBLY FOR A SNOW BICYCLE

FIELD OF THE INVENTION

The present invention relates to rear drive assembly intended to attach to or replace a rear wheel of a bicycle and drive the bicycle forward in snow.

BACKGROUND OF THE INVENTION

Snow bicycles are well known. U.S. Pat. No. 1,261,204 (Barton 1918) and U.S. Pat. No. 1,281,980 (Kostewich 1918) are early examples of snow bicycles. Some more recent examples include U.S. patents: U.S. Pat. No. 5,423,559 (Rhode 1995); U.S. Pat. No. 5,738,361 (Landucci 1998); U.S. Pat. No. 6,511,079 U.S. Pat. No. 6,626,258 (Forbes 2003); and U.S. Pat. No. 6,663,117 (Cheney et al 2003). A rear drive assembly for a snow bicycle which is believed to represent the closest known prior art is Canadian Patent Application 2,154,729.

SUMMARY OF THE INVENTION

According to the present invention there is provided a rear drive assembly for a snow bicycle which includes a body adapted to be supported by an axle which rotatably supports a rear wheel of a bicycle. An upper arm is rigidly affixed to and extends upwardly from the body. The upper arm has a remote attachment end. A lower arm is rigidly affixed to and extends at an angle downwardly and rearwardly from the body. The lower arm has a remote attachment end. A track tensioning and guide assembly is positioned at the remote attachment end of the lower arm. The track tensioning and guide assembly includes a first arm having a first end and a second end and a second arm having a first end and a second end. The first end of the first arm and the first end of the second arm are pivotally mounted for pivotal movement about a common horizontal pivot axis. Three track engaging tensioning and guide wheels are arranged in a triangular configuration. A first wheel is rotatably mounted at the first end of the first arm and the first end of the second arm. A second wheel is mounted at the second end of the first arm. A third wheel is mounted at the second end of the second arm. Means are provided to bias the second end of the first arm and the second end of the second arm away from each other to exert a tensioning force upon a track extending over the rear wheel of the bicycle and over the three track engaging tensioning and guide wheels of the track tensioning and guide assembly. An extendible and retractable attachment member is positioned at the remote attachment end of the upper arm. The attachment member is adapted for attachment to one of a seat post or that portion of a bicycle frame supporting the seat post. As the bicycle begins to ascend a slope the attachment member retracts to maintain the track in ground contact and as the bicycle begins to descend the slope the attachment member extends to maintain the track in ground contact.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, a rear drive assembly generally identified by reference numeral 10, will now be described with reference to FIGS. 1 through 6. A review of the prior art discloses two alternative approaches to installation of a rear drive assembly. Some of the prior art rear drive assemblies come with their own drive wheel and with a track already in position. Other of the prior art drive assemblies do not have their own drive wheel, but rather use the rear wheel of the bicycle as the drive wheel. In such cases, the track is positioned over the rear wheel of the bicycle. This can be either over the entire tire or over the rim (the tire having been removed). It will be understood that the rear drive assembly of the present invention could be constructed either way. It is believed that a greater drive force can be created by providing a rear drive assembly with its own drive wheel and with a track especially adapted to engage the drive wheel. This is the preferred embodiment which will hereinafter described.

Figure 1:
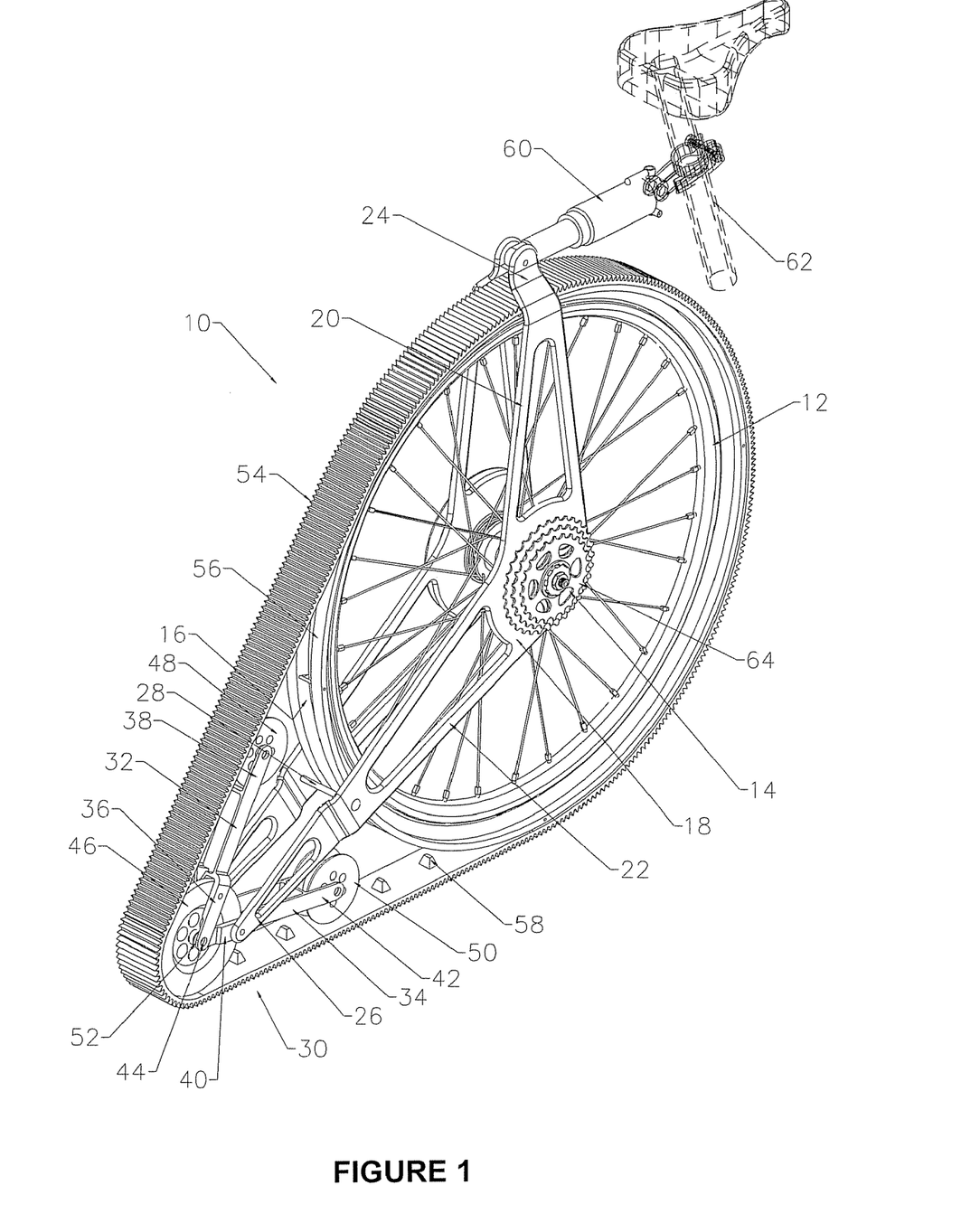
FIG. 1 is a perspective view of a rear drive assembly constructed in accordance with the teachings of the present invention.
Figure 2:
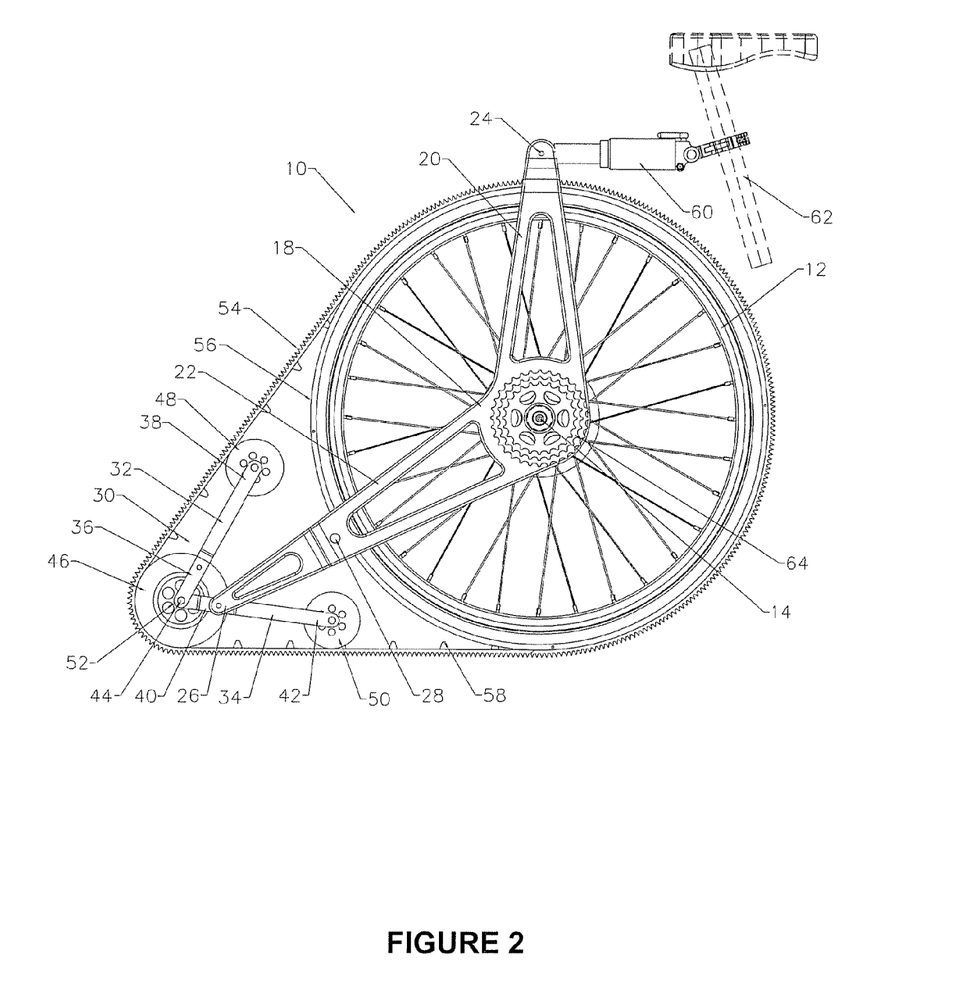
FIG. 2 is a side elevation view of the rear drive assembly illustrated in FIG. 1.

Structure and Relationship of Parts:

Referring to FIG. 1, rear drive assembly 10 includes a drive wheel 12. As previously described, drive wheel 12 can be the rear wheel of a bicycle or can be a drive wheel adapted to substitute for the rear wheel of the bicycle. Drive wheel 12 has an axle 14, about which drive wheel 12 rotates. Drive wheel 12 also has a circumferential track engagement profile 16. A body, generally identified by reference numeral 18 is provided. Body 18 is adapted to be supported by axle 14 of drive wheel 12. Body 18 has an upper arm 20 and a lower arm 22. Upper arm 20 is rigidly affixed to and extends upwardly from body 18, terminating in a remote attachment end 24. Lower arm 22 is rigidly affixed to and extends at an angle downwardly and rearwardly from body 18, terminating in a remote attachment end 26. It is preferred that body 18, upper arm 20 and lower arm 22 be made in two portions, which are placed on either side of drive wheel 12. A reinforcing brace member 28 extends between the two portions to maintain their relative spacing. A track tensioning and guide assembly, generally identified by reference numeral 30, is positioned at remote attachment end 26 of lower arm 22. Track tensioning and guide assembly 30 includes an upper or first arm 32 and a lower or second arm 34. First arm 32 has a first end 36 and a second end 38. Second arm 34 has a first end 40 and a second end 42. First end 36 of first arm 32 and first end 40 of second arm 34 are pivotally mounted for pivotal movement about a common horizontal pivot axis defined by axle 44. Three track engaging tensioning and guide wheels (46, 48, 50) are arranged in a triangular configuration. A first wheel 46 is rotatably mounted at first end 36 of first arm 32 and first end 40 of second arm 34. A second wheel 48 is mounted at second end 38 of first arm 32. A third wheel 50 is mounted at second end 42 of second arm 34. A torsion spring 52 is provided, which serves as means to bias second end 38 of first arm 32 and second end 42 of second arm 34 away from each other. A track 54 is positioned around an outer circumference 56 of drive wheel 12. Track is engaged with the three track engaging tensioning and guide wheels (46, 48, 50) of the track tensioning and guide assembly 30. Track 54 has an interior profile consisting of raised projections 58, which are adapted to engage with track engaging profile 16 on drive wheel 12 and like track engaging profiles on each of track tensioning and guide wheels (46, 48 and 50). As will hereinafter be further described, track engaging tensioning and guide wheels (46, 48, 50) of track tensioning and guide assembly 30 exert a tensioning force upon track 54 as the track 54 follows underlying ground contours. A comparison of FIG. 2 and FIG. 5, assists in demonstrating the manner in which track tensioning and guide assembly 30 operates to maintain tension upon track 54 as it "steps over" underlying obstacles. A comparison of FIG. 2 and FIG. 6, assists in demonstrating the manner in which track tensioning and guide assembly 30 operates to maintain tension upon track 54 as it follows underlying ground depressions. Referring to FIG. 2, an extendible and retractable attachment member 60 is positioned at remote attachment end 24 of upper arm 20. Attachment member 60 is adapted for attachment to a seat post 62 of a bicycle (not shown). One form of attachment member 60 which may be used is a gas, air, hydraulic or spring shock absorber. There may be other types of extendible and retractable members based upon other technologies that would also be suitable.

Figure 3:
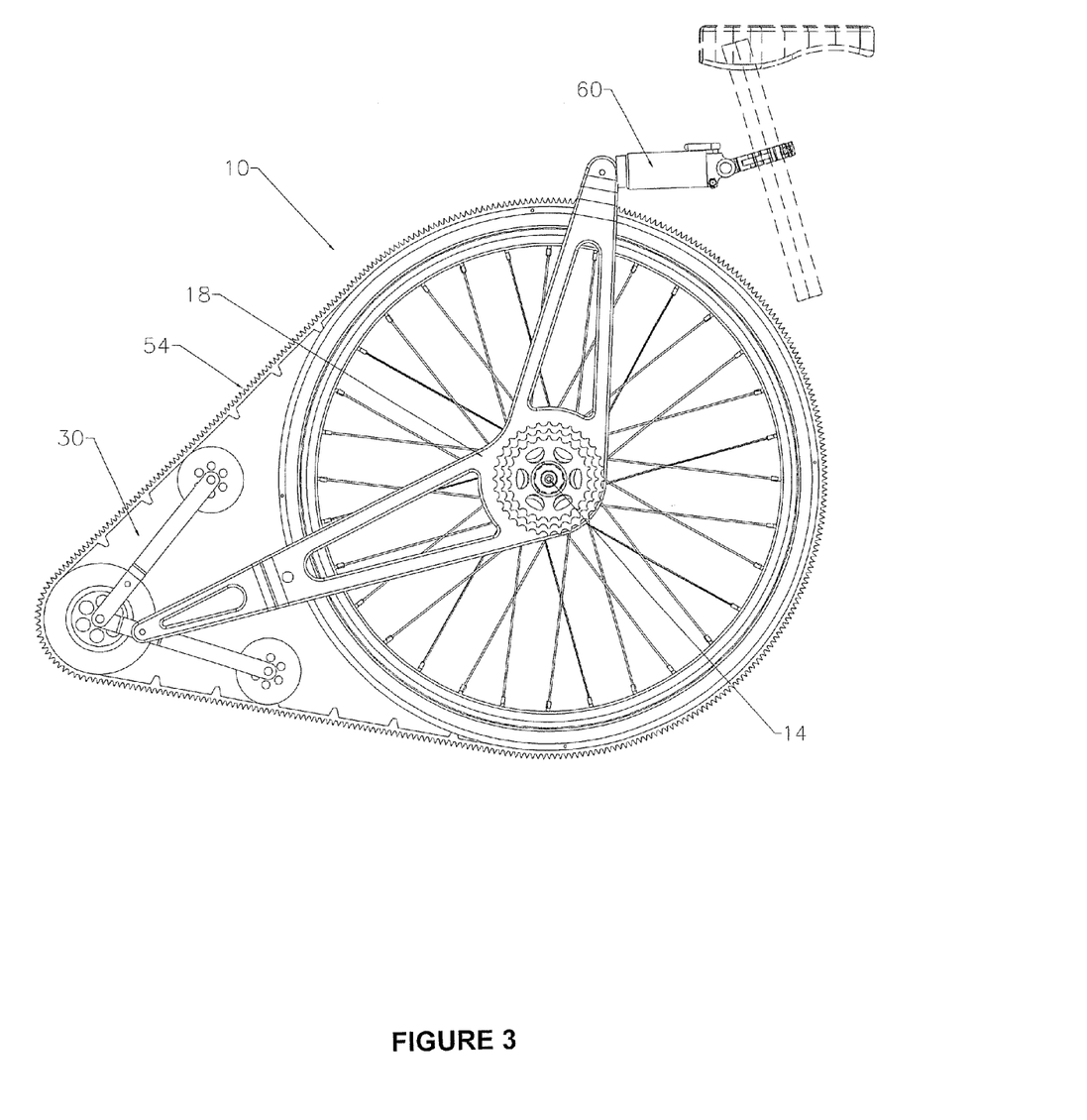
FIG. 3 is a side elevation view of the rear drive assembly illustrated in FIG. 2, with the track tensioning and guide assembly raised as it follows ground contours and the attachment member refracted to accommodate the raising of the track tensioning and guide assembly.
Figure 4:
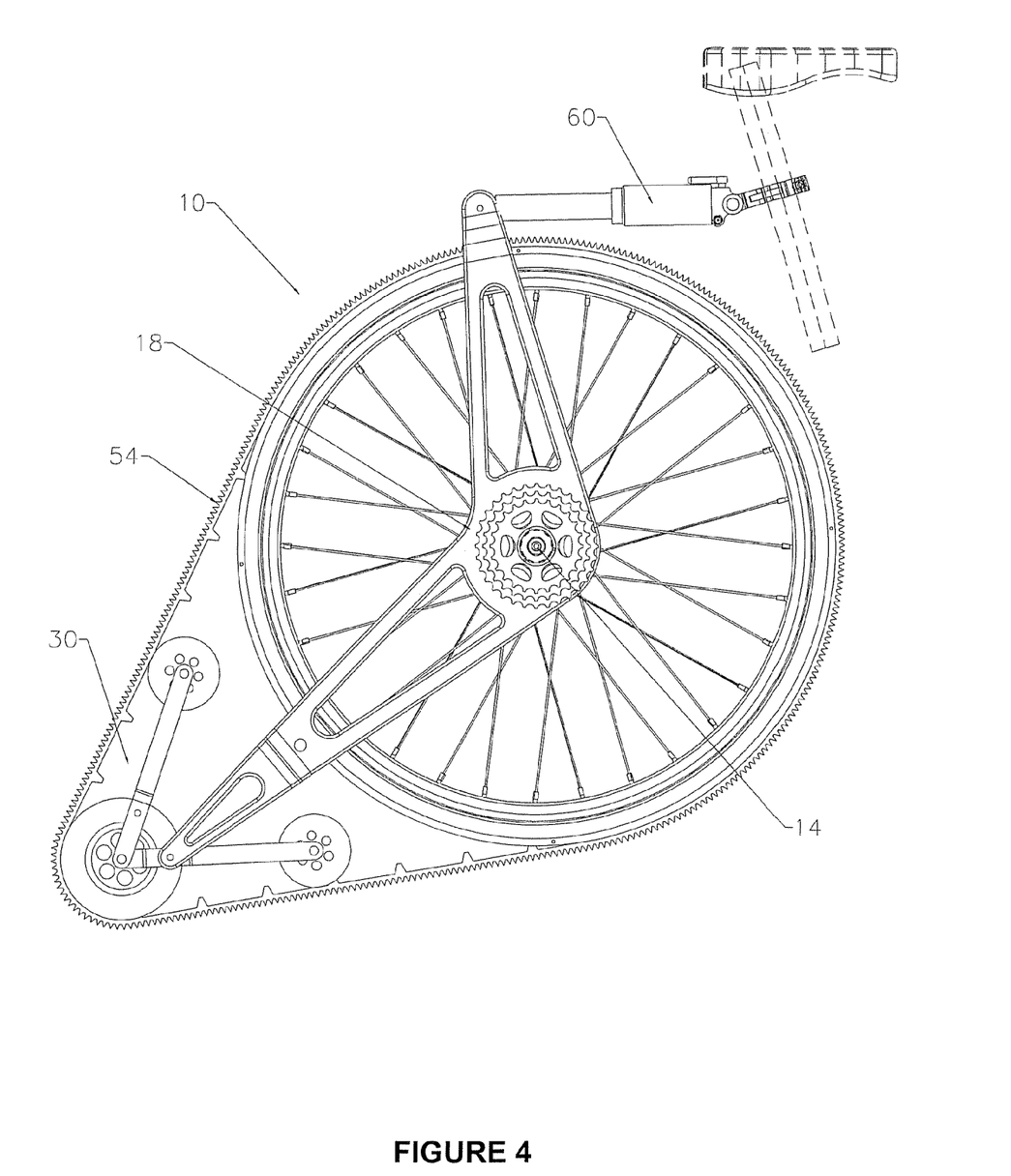
FIG. 4 is a side elevation view of the rear drive assembly illustrated in FIG. 2, with the track tensioning and guide assembly lowered as it follows ground contours and the attachment member extended to accommodate the lowering of the track tensioning and guide assembly.
Figure 5:
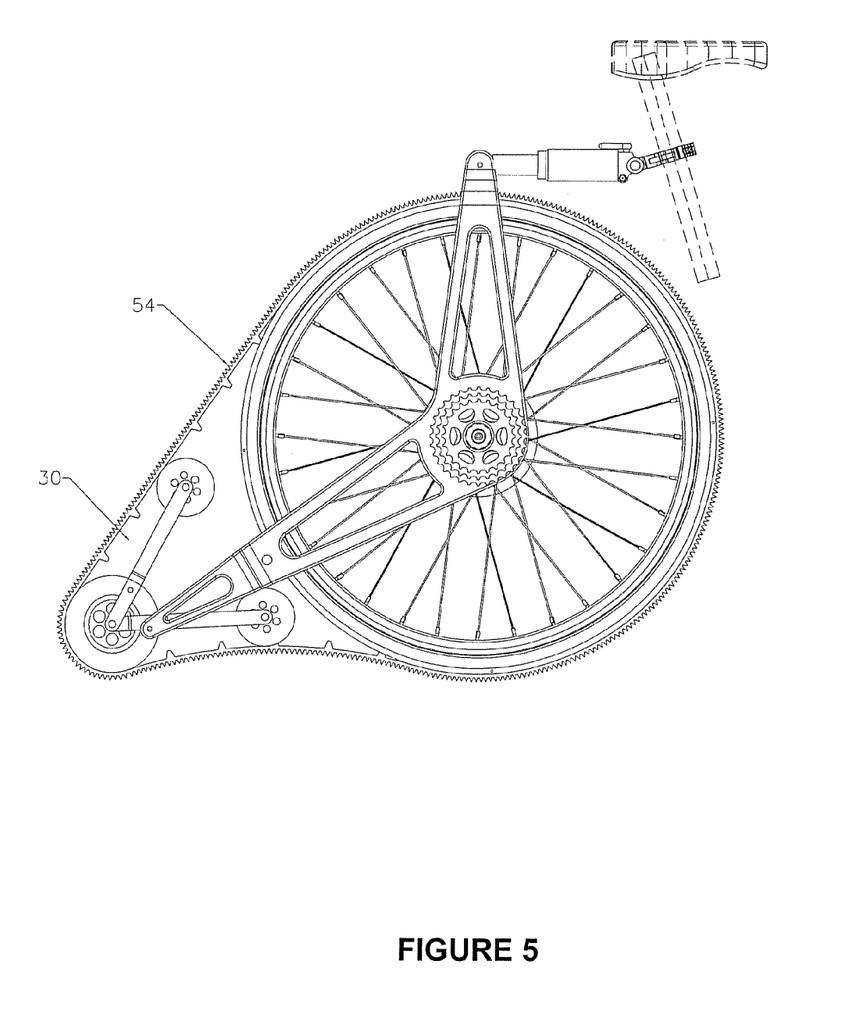
FIG. 5 is a side elevation view of the rear drive assembly illustrated in FIG. 2, with the track tensioning and guide assembly adjusting upwardly to accommodate an underlying obstacle.
Figure 6:
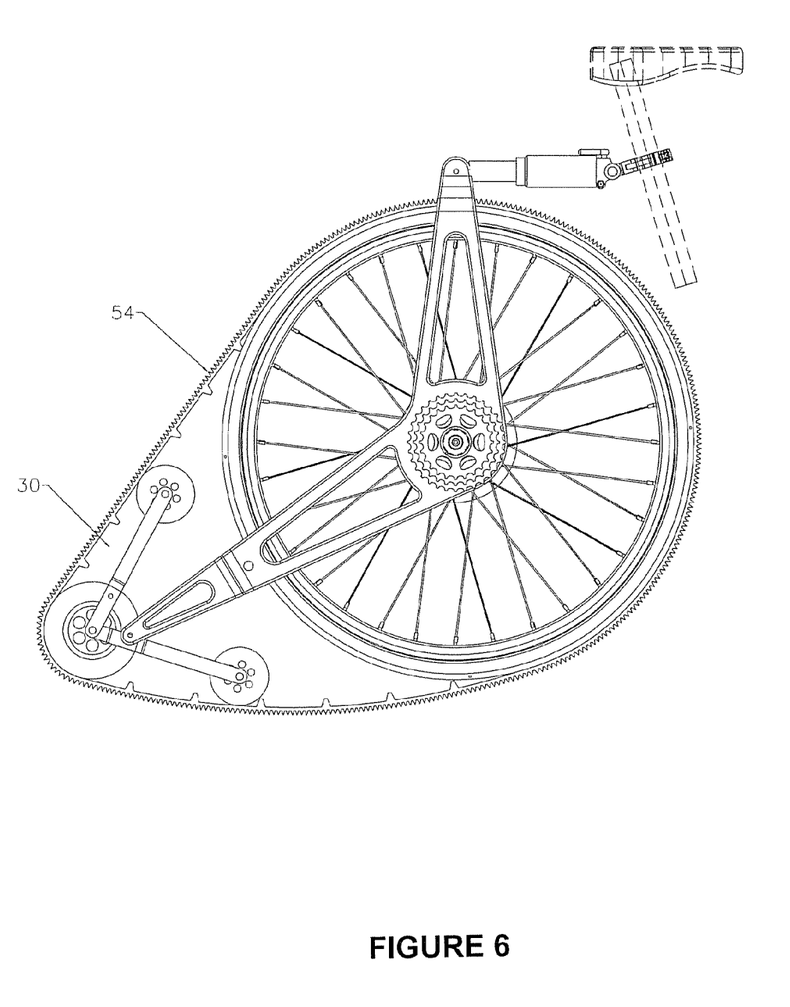
FIG. 6 is a side elevation view of the rear drive assembly illustrated in FIG. 2, with the track tensioning and guide assembly adjusting downwardly to accommodate an underlying ground depression.

Operation:

The use and operation of rear drive assembly 10 will now be described with reference to FIGS. 1 through 6. Referring to FIG. 2, rear drive assembly 10 is substituted for a rear wheel of bicycle. The manner in which rear wheels of bicycles are mounted to modern bicycles varies. Some bicycles have axle mounting positions on their frame, other bicycles have rear spring arms on which the axle is mounted, and still other bicycles have what one may refer to as "rear forks". Regardless of the bicycle structure, axle 14 of drive wheel 12 is mounted in the same manner that the rear wheel of the bicycle is mounted. Attachment member 60 is then secured to seat post 62. As the distance to seat post 62 varies with different makes of bicycles, some initial adjustment of attachment member 60 may be necessary to assume the correct telescopic position. A drive chain (not shown) is extended from the bicycle to drive sprocket 64 on drive wheel 12, so when a rider pedals drive wheel 12 rotates. As drive wheel 12 rotates, track 54 is moved forward due to the engagement between raised projections 58 on the interior profile of track 54 and track engaging profile 16 on drive wheel 12. Track tensioning and guide assembly 30 maintains tension on track 54. It will be understood that, as long as track 54 is able to maintain contact with the ground, that rear drive assembly will serve to drive the bicycle forward. Remote end 26 of lower arm 22 is attached to second arm 34 of track tensioning and guide assembly 30. This point of attachment tends to force both first wheel 46 and third wheel 50 downwardly and improve contact of track 54 with the ground. However, maintaining track 54 in contact with the ground can be a challenge when changing ground contours are encountered. Referring to FIG. 3, it can be seen how rear drive assembly 10 adjusts to changes as the bicycle ascends a slope. Ground contact with track tensioning and guide assembly 30 forces body 18 to pivots upwardly and attachment member 60 retracts accommodate this pivotal movement and maintain track 54 in ground contact. Referring to FIG. 4, it can be seen how rear drive assembly 10 adjusts to changes as the bicycle descends the slope. Track tensioning and guide assembly 30 descends to the ground, body 18 pivots to allow track tensioning and guide assembly 30 to reach the ground and attachment member 60 extends to accommodate this movement and maintain track 54 in ground contact. Even on relatively flat ground obstacles can be encountered that track 54 must "walk" over. Referring to FIG. 5, it can been seen how tensioning and guide assembly 30 permits track 54 to "walk" over an obstacle, without a portion of track 54 being lifted and losing contact with the ground. Even relatively flat ground has the occasional depression. Referring to FIG. 6, it can be seen how tensioning and guide assembly 30 permits track 54 to follow ground contours, including ground depressions.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A rear drive assembly for a snow bicycle, comprising:
   a body adapted to be supported by an axle which rotatably supports a rear wheel of a bicycle, with a drive sprocket of the wheel positioned outside of the body such that it is accessible to an external drive chain;
   an upper arm rigidly affixed to and extending upwardly from the body, the upper arm having a remote attachment end;
   a lower arm rigidly affixed to and extending at an angle downwardly and rearwardly from the body, the lower arm having a fixed angular relationship to the upper arm, the lower arm having a remote attachment end;
   a track tensioning and guide assembly positioned at the remote attachment end of the lower arm, the track tensioning and guide assembly including a first arm having a first end and a second end, a second arm having a first end and a second end, the first end of the first arm and the first end of the second arm being pivotally mounted for pivotal movement about a common horizontal pivot axis, three track engaging tensioning and guide wheels being arranged in a triangular configuration with a first wheel rotatably mounted at the first end of the first arm and the first end of the second arm, a second wheel mounted at the second end of the first arm and a third wheel mounted at the second end of the second arm, means being provided to bias the second end of the first arm and the second end of the second arm away from each other to exert a tensioning force upon a track extending over the rear wheel of the bicycle and over the three track engaging tensioning and guide wheels of the track tensioning and guide assembly, the remote attachment end of the lower arm being attached to the second arm to force said first wheel and third wheel into ground contact; and an extendible and retractable attachment member positioned at the remote attachment end of the upper arm, the attachment member being adapted for attachment to a seat post of a bicycle, the extendible and retractable attachment member controlling movement of the upper arm toward and away from the seat post, such that as the bicycle begins to ascend a slope the attachment member retracts to maintain the track in ground contact and as the bicycle begins to descend the slope the attachment member extends to maintain the track in ground contact.

2. A rear drive assembly for a snow bicycle, comprising:

a drive wheel adapted to substitute for a rear wheel of a bicycle, the drive wheel having an axle about which the drive wheel rotates and a circumferential track engagement profile;

a body adapted to be supported by the axle of the drive wheel, with a drive sprocket of the wheel positioned outside of the body such that it is accessible to an external drive chain;

an upper arm rigidly affixed to and extending upwardly from the body, the upper arm having a remote attachment end;

a lower arm rigidly affixed to and extending at an angle downwardly and rearwardly from the body, the lower arm having a fixed angular relationship to the upper arm, the lower arm having a remote attachment end;

a track tensioning and guide assembly positioned at the remote attachment end of the lower arm, the track tensioning and guide assembly including a first arm having a first end and a second end, a second arm having a first end and a second end, the first end of the first arm and the first end of the second arm being pivotally mounted for pivotal movement about a common horizontal pivot axis, three track engaging tensioning and guide wheels being arranged in a triangular configuration with a first wheel rotatably mounted at the first end of the first arm and the first end of the second arm, a second wheel mounted at the second end of the first arm and a third wheel mounted at the second end of the second arm, means being provided to bias the second end of the first arm and the second end of the second arm away from each other, the remote attachment end of the lower arm being attached to the second arm to force said first wheel and third wheel into ground contact;

a track positioned around a circumference of the drive wheel and engaged with the three track engaging tensioning and guide wheels of the track tensioning and guide assembly, the track having an interior profile adapted to engage with track engaging profile on the drive wheel, the track engaging tensioning and guide wheels of the track tensioning and guide assembly exerting a tensioning force upon the track as the track follows underlying ground contours; and an extendible and retractable attachment member positioned at the remote attachment end of the upper arm, the attachment member being adapted for attachment to a seat post of a bicycle, the extendible and retractable attachment member controlling movement of the upper arm toward and away from the seat post, such that as the bicycle begins to ascend a slope the attachment member retracts to maintain the track in ground contact and as the bicycle begins to descend the slope the attachment member extends to maintain the track in ground contact.

3. A rear drive assembly for a snow bicycle, comprising:

a drive wheel adapted to substitute for a rear wheel of a bicycle, the drive wheel having an axle about which the drive wheel rotates and a circumferential track engagement profile;

a body supported by the axle of the drive wheel, with a drive sprocket of the wheel positioned outside of the body such that it is accessible to an external drive chain;

an upper arm rigidly affixed to and extending upwardly from the body, the upper arm having a remote attachment end;

a lower arm rigidly affixed to and extending at an angle downwardly and rearwardly from the body, the lower arm having a fixed angular relationship to the upper arm, the lower arm having a remote attachment end;

a track tensioning and guide assembly positioned at the remote attachment end of the lower arm, which includes tensioning and guide wheels;

a track positioned around a circumference of the drive wheel and engaged with the track tensioning and guide assembly, the track having an interior profile adapted to engage with track engaging profile on the drive wheel, the track engaging tensioning and guide wheels of the track tensioning and guide assembly exerting a tensioning force upon the track as the track follows underlying ground contours; and an extendible and retractable seat post attachment member positioned at the remote attachment end of the upper arm, the attachment member being adapted for attachment to a seat post of a bicycle, the attachment member controlling movement of upper arm toward and away from the seat post, such that as the bicycle begins to ascend a slope the attachment member retracts to maintain the track in ground contact and as the bicycle begins to descend the slope the attachment member extends to maintain the track in ground contact.

* * * * *

UNITED STATES PATENT AND TRADEMARK OFFICE
CERTIFICATE OF CORRECTION

PATENT NO.          : 7,232,130 B2                                          Page 1 of 1
APPLICATION NO.  : 11/425656
DATED                  : June 19, 2007
INVENTOR(S)         : K. Reeves It is certified that error appears in the above-identified patent and that said Letters Patent is hereby corrected as shown below:

| COLUMN | LINE | ERROR |
|---|---|---|
| TITLE PAGE, ITEM (56) Pg. 2, col. 2 | Refs. Cited (U.S. Pats., Item 17) | "2004/012459 A1" should read --2004/0125154 A1-- |

Signed and Sealed this

Thirteenth Day of November, 2007

JON W. DUDAS
*Director of the United States Patent and Trademark Office*